(12) United States Patent
Cha et al.

(10) Patent No.: US 11,795,597 B2
(45) Date of Patent: Oct. 24, 2023

(54) WASHING APPARATUS CAPABLE OF ADJUSTING OPERATION BASED ON ADDITIONAL LAUNDRY AND METHOD OF CONTROLLING THE SAME

(71) Applicant: LG ELECTRONICS INC., Seoul (KR)

(72) Inventors: Seung Chul Cha, Suwon-si (KR); Sang Hyun Lee, Seoul (KR); Hyunji Park, Seoul (KR); Bonkwon Koo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 489 days.

(21) Appl. No.: 16/850,539

(22) Filed: Apr. 16, 2020

(65) Prior Publication Data
US 2021/0189627 A1 Jun. 24, 2021

(30) Foreign Application Priority Data
Dec. 19, 2019 (KR) .................. 10-2019-0171148

(51) Int. Cl.
*D06F 34/22* (2020.01)
*D06F 33/34* (2020.01)
(Continued)

(52) U.S. Cl.
CPC .............. *D06F 34/22* (2020.02); *D06F 33/34* (2020.02); *D06F 33/36* (2020.02); *D06F 33/37* (2020.02); *D06F 34/18* (2020.02); *D06F 34/24* (2020.02); *G06N 3/08* (2013.01); *D06F 2103/04* (2020.02); *D06F 2103/16* (2020.02);
(Continued)

(58) Field of Classification Search
CPC .......... D06F 33/34; D06F 33/36; D06F 33/37; D06F 34/18; D06F 34/22; D06F 34/28; D06F 39/02; D06F 2103/04; D06F 2103/20; D06F 2103/22; D06F 2105/42; D06F 2105/48; D06F 2105/52; D06F 2105/56;
(Continued)

(56) References Cited

U.S. PATENT DOCUMENTS 5,241,845 A * 9/1993 Ishibashi .............. G05B 19/042
68/12.02
2019/0093276 A1* 3/2019 Hombroek .............. D06F 34/18
(Continued)

FOREIGN PATENT DOCUMENTS

| KR | 1019940021799 | 10/1994 |
| KR | 100171288 | 10/1998 |

(Continued)

OTHER PUBLICATIONS

Machine translation of KR-20150075464-A. (Year: 2015).*
Machine translation of WO-2019074218-A1. (Year: 2019).*

*Primary Examiner* — Joseph L. Perrin
(74) *Attorney, Agent, or Firm* — LEE, HONG, DEGERMAN, KANG & WAIMEY PC

(57) ABSTRACT

Provided are a washing apparatus that is capable of being operated in an Internet of Things (IoT) environment over a 5G communication network and estimating additional laundry that is introduced and the amount of detergent that is additionally introduced based thereon through a neural network model generated based on machine learning, and a method of controlling the same.

9 Claims, 9 Drawing Sheets

(51) Int. Cl.
   *D06F 33/37*    (2020.01)
   *D06F 34/24*    (2020.01)
   *D06F 33/36*    (2020.01)
   *D06F 34/18*    (2020.01)
   *D06F 105/42*   (2020.01)
   *D06F 103/22*   (2020.01)
   *D06F 105/56*   (2020.01)
   *D06F 105/48*   (2020.01)
   *D06F 105/52*   (2020.01)
   *D06F 103/04*   (2020.01)
   *D06F 103/16*   (2020.01)
   *G06N 3/08*     (2023.01)

(52) U.S. Cl.
   CPC ...... *D06F 2103/22* (2020.02); *D06F 2105/42* (2020.02); *D06F 2105/48* (2020.02); *D06F 2105/52* (2020.02); *D06F 2105/56* (2020.02)

(58) Field of Classification Search
   CPC ... D06F 2105/58; D06F 34/24; D06F 2103/16
   See application file for complete search history.

(56) References Cited

U.S. PATENT DOCUMENTS

2020/0240066 A1* 7/2020 Ko .......................... D06F 34/32
2022/0034015 A1* 2/2022 David ..................... D06F 39/02

FOREIGN PATENT DOCUMENTS

KR        20150075464 A  *  7/2015
WO     WO-2019074218 A1 *  4/2019  ............. D06F 33/00

* cited by examiner

WASHING APPARATUS CAPABLE OF ADJUSTING OPERATION BASED ON ADDITIONAL LAUNDRY AND METHOD OF CONTROLLING THE SAME

CROSS-REFERENCE TO RELATED APPLICATION

Pursuant to 35 U.S.C. § 119(a), this application claims the benefit of earlier filing date and right of priority to Korean Patent Application No. 10-2019-0171148, filed on Dec. 19, 2019, the contents of which are hereby incorporated by reference herein in its entirety.

BACKGROUND

1. Technical Field

The present disclosure relates to a washing apparatus capable of adjusting a washing cycle based on the amount of additionally loaded laundry, the contaminated state of the additionally loaded laundry, etc. and a method of controlling the same.

2. Description of Related Art

The following description is only for the purpose of providing background information related to embodiments of the present disclosure, and the contents to be described do not necessarily constitute related art.

When laundry to be washed is loaded into a washing machine, the washing machine supplies water and detergent, and washes contaminants from the laundry using the movement of the dynamic components therein.

The washing machine performs washing through a series of operations such as a washing cycle of removing contaminants from laundry using washing water having detergent dissolved therein, a rinsing cycle of removing bubbles or residual detergent from the laundry using rinsing water having no detergent therein, and a spinning cycle of removing water from the laundry at a high speed. The washing cycle may be configured such that, when a user selects a washing course, the weight of laundry is detected in order to set the amount of washing water, and after detergent is introduced into a tub together with an amount of water that is capable of sufficiently wetting the laundry based on the set amount of the washing water, a washing tub is rotated in order to transmit detergent water (water+detergent) to the laundry and to drop the laundry, whereby washing is performed.

In the case in which additional laundry that had not been found by a user and needs to be washed is found in the initial stage of the washing cycle however, a function of introducing the additional laundry is needed.

In this case, even though the additional laundry is introduced into the washing machine, washing is performed based on the washing course set by the user, whereby the additional laundry may not be effectively washed.

In connection therewith, Korean Patent Application No. 10-1995-0019500 entitled WASHING CONTROL METHOD BASED ON ADDITION OF LAUNDRY discloses technology of introducing additional laundry into a washing machine during washing, changing a washing condition, and resuming the washing.

Described in the above patent is technology of determining whether a user inputs additional introduction of laundry after opening a lid of the washing machine, and of setting the amount of detergent based on the amount of the additional laundry in order to perform washing. However, the above patent is limited in that it is not possible to detect the degree of contamination of the additional laundry and the washing machine performs washing after a washing condition is reset based on the addition of laundry.

Korean Patent Registration No. 10-0600061 entitled DRUM WASHING MACHINE AND METHOD OF CONTROLLING THE SAME discloses technology of adjusting the operation rate of a drum motor and the number of times that replenishment water is introduced based on a washing progress rate in the case in which laundry is additionally introduced in order to control the washing operation.

Described in the above patent is technology of applying a washing condition to the initial washing condition or changing the washing condition to a more strengthened condition than the initial washing condition (for example, an increase in washing time) based on the point in time at which laundry is additionally introduced. However, the above patent is limited in overcoming technology of detecting the degree of contamination of the additional laundry and changing the washing condition based on the degree of contamination of the additional laundry.

Meanwhile, Korean Patent Application Publication No. 1994-0021799 entitled WASHING METHOD AND APPARATUS THEREFOR discloses technology of resetting washing water irrespective of a change in amount of laundry introduced into a washing machine in order to perform washing.

In the above patent, the washing water is reset based on the amount of the additional laundry. However, measuring the degree of contamination of the additional laundry to set the washing water and setting the amount of detergent that is introduced based thereon are not described.

In order to overcome the limits described above, there is a need to provide a solution for more accurately detecting the type and amount of detergent even when the user directly selects and adds detergent, thereby allowing the operation of the washing machine to be adjusted.

The background art described above may be technical information retained by the present inventors in order to derive the present disclosure or acquired by the present inventors along the process of deriving the present disclosure, and thus is not necessarily a known art disclosed to the general public before the filing of the present application.

SUMMARY OF THE PRESENT DISCLOSURE

Embodiments of the present disclosure are directed to performing appropriate washing in the case in which laundry is additionally introduced into a washing machine.

Embodiments of the present disclosure are further directed to performing appropriate washing by introducing, into the washing machine, additional detergent and additional washing water necessary depending on the degree of contamination of laundry that is additionally introduced into the washing machine even in the case in which the additional laundry contains an excessive amount of contaminants.

Embodiments of the present disclosure are also directed to performing appropriate washing by measuring the degree of contamination of washing water and adjusting a washing course of the washing machine based on the measured degree of contamination or re-performing washing, when laundry is additionally introduced into the washing machine.

Aspects of the present disclosure is not limited to the above-mentioned aspects, and other aspects and advantages of the present disclosure, which are not mentioned, will be understood through the following description, and will become apparent from the embodiments of the present disclosure. It is also to be understood that the aspects of the present disclosure may be realized by means and combinations thereof set forth in claims.

A method of controlling a washing apparatus according to an embodiment of the present disclosure may include performing a first washing cycle based on the amount of laundry introduced into a tub of the washing apparatus, detecting additional laundry introduced into the tub during the first washing cycle, determining the amount of the additional laundry, introducing detergent into the tub based on the amount of the additional laundry, operating the tub and measuring the degree of contamination of washing water, and setting a second washing cycle based on the degree of contamination.

In the case in which the additional laundry is introduced, a washing algorithm may be operated in order to estimate the amount of detergent that is additionally introduced based on the degree of contamination of the additional laundry such that effective washing can be performed.

A washing apparatus according to another embodiment of the present disclosure may include a tub into which laundry is introduced, a water supply configured to supply washing water to the tub, a sensor configured to detect additional laundry introduced into the tub during a first washing cycle of the laundry and detergent introduced into the tub based on the amount of the additional laundry, and a processor configured to measure the degree of contamination of the washing water generated by the operation of the tub and to set a second washing cycle based on the measured degree of contamination.

Consequently, it is possible to perform appropriate washing by introducing additional detergent and additional washing water necessary depending on the degree of contamination of laundry that is additionally introduced into the washing machine, even in the case in which the additional laundry contains an excessive amount of contaminants.

According to an embodiment of the present disclosure may include performing a first washing cycle based on detecting an initial amount of laundry in a tub of a washing apparatus, determining an amount of additional laundry added into the tub during the first washing cycle, adding detergent into the tub based on the determined amount of the additional laundry, measuring a degree of contamination of washing water in the tub due to the additional laundry and setting a second washing cycle based on the measured degree of contamination.

According to an embodiment of the present disclosure may include a tub, wherein the tub is configured to accommodate laundry, a water supply configured to supply water to the tub, a sensor configured to detect additional laundry and detergent in the tub, wherein the additional laundry is added into the tub with an initial amount of laundry during a first washing cycle of the laundry and the detergent is added into the tub based on an amount of the additional laundry and a processor configured to measure a degree of contamination of the washing water in the tub due to the additional laundry, and to set a second washing cycle based on the measured degree of contamination.

Other aspects and features than those described above will become apparent from the following drawings, claims, and detailed description of the present disclosure.

As is apparent from the above description, according to embodiments of the present disclosure, when additional laundry is introduced into the washing machine, it is possible to detect the additional laundry that is introduced and to detect the quality of washing water contaminated by the additional laundry. As a result, it is possible to provide a washing machine and a method of controlling the same that are capable of automatically introducing the amount of additional detergent appropriate to the contaminated washing water such that the additional laundry can be appropriately washed.

In addition, according to embodiments of the present disclosure, when laundry is additionally introduced, washing progress time, the water level, the conductivity, and the turbidity of washing water, etc. are trained in order to detect the amount of additional detergent so as to be appropriate to the degree of contamination of additional laundry and the amount of the additional laundry such that the washing apparatus can perform appropriate washing and rinsing cycles.

In addition, according to embodiments of the present disclosure, the degree of contamination of the washing water due to the additional laundry is determined, and the washing time, the washing motion, and the washing cycle are changed based on the determined degree of contamination of the washing water such that effective washing can be performed.

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION

Figure 1:
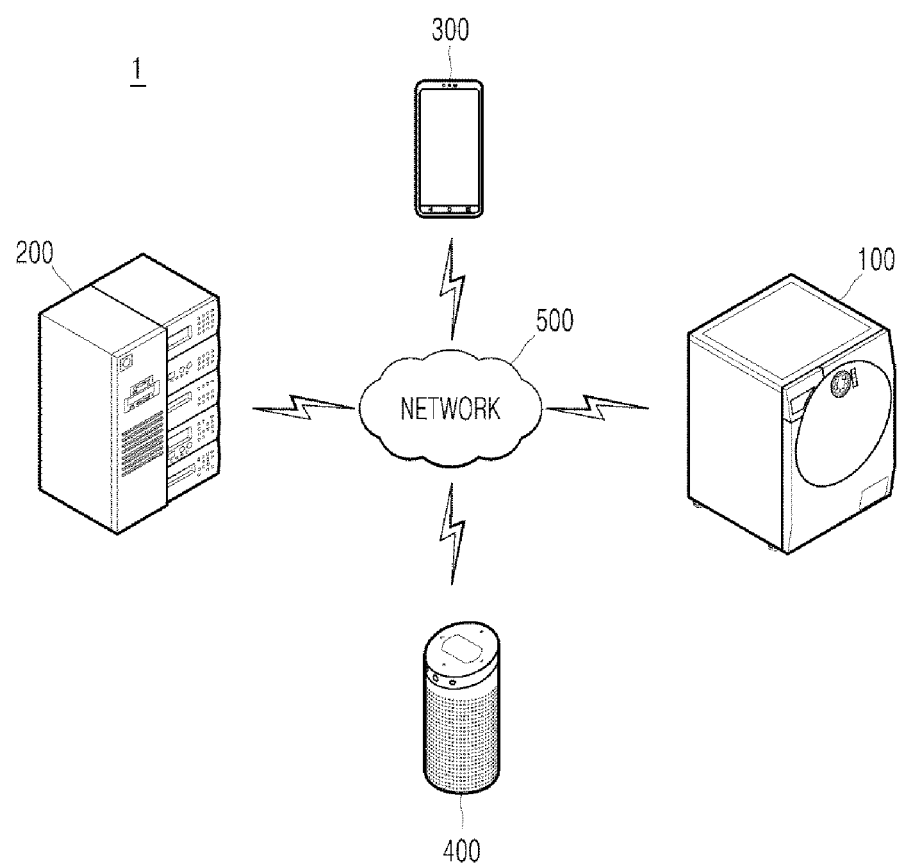
FIG. 1 is an exemplary view illustrating a system environment in which a washing machine, a user terminal, an artificial intelligence speaker, and an external server are connected to each other according to an embodiment of the present disclosure.

Hereinafter the embodiments disclosed in this specification will be described in detail with reference to the accompanying drawings. The present disclosure may be embodied in various different forms and is not limited to the embodiments set forth herein. Hereinafter in order to clearly describe the present disclosure, parts that are not directly related to the description are omitted. However, in implementing an apparatus or a system to which the spirit of the present disclosure is applied, it is not meant that such an omitted configuration is unnecessary. Further, like reference numerals refer to like elements throughout the specification.

In the following description, although the terms "first", "second", and the like may be used herein to describe various elements, these elements should not be limited by these terms. These terms may be only used to distinguish one element from another element. Also, in the following description, the articles "a," "an," and "the," include plural referents unless the context clearly dictates otherwise.

In the following description, it will be understood that terms such as "comprise," "include," "have," and the like are intended to specify the presence of stated feature, integer, step, operation, component, part or combination thereof, but do not preclude the presence or addition of one or more other features, integers, steps, operations, components, parts or combinations thereof.

Meanwhile, a washing apparatus according to an embodiment of the present disclosure may include, for example, a washing machine, a dishwasher, and an industrial washing machine; however, embodiments of the present disclosure will be described hereinafter based on a washing machine which is mainly used in homes by way of example for convenience of description.

FIG. 1 is an exemplary view illustrating a system environment in which a washing machine, a user terminal, an artificial intelligence speaker, and an external server are connected to each other according to an embodiment of the present disclosure.

As illustrated in FIG. 1, a washing machine 100 according to an embodiment of the present disclosure may operate in a driving environment including a user terminal 300 capable of communicating with the washing machine 100, an external server 200, an artificial intelligence speaker 400, and a network 500 connecting these components to each other.

The washing machine 100 may include a transceiver, an input interface, a sensor including a detergent detection sensor, an output interface including a display, a storage including memory, a power supply, a washing unit including physical devices such as washing tub required for washing, and a controller including a washing machine MCU.

The controller of the washing machine 100 may include any kind of device capable of processing data like a processor (for example, an MCU). Here, "processor" may, for example, refer to a data processing device embedded in hardware, which has a physically structured circuitry to perform a function represented by codes or instructions contained in a program.

As examples of the data processing device embedded in hardware, a microprocessor, a central processor (CPU), a processor core, a multiprocessor, an application-specific integrated circuit (ASIC), and a field programmable gate array (FPGA) may be included, but the scope of the present disclosure is not limited thereto.

The transceiver of the washing machine 100 may transmit a value received by the detergent detection sensor or various pieces of information related to the operation of the washing machine to the external server 200 through a wired or wireless network 500, and the external server 200 may transmit information about laundry detergent and various pieces of washing information to the washing machine 100, the user terminal 300, and the artificial intelligence speaker 400.

The transceiver of the washing machine 100 may cooperate with the network 500 so as to provide a communication interface required to provide transmission/reception signals among the artificial intelligence speaker 400, the user terminal 300, and/or the external server 200 in the form of packet data.

In addition, the transceiver of the washing machine 100 may support various kinds of object-to-object intelligent communication (such as Internet of things (IoT), Internet of everything (IoE), and Internet of small things (IoST)), and may support communication such as machine to machine (M2M) communication, vehicle to everything communication (V2X), and device to device (D2D) communication.

The washing machine 100 may extract detergent information, and may determine an optimal washing operation method using big data, artificial intelligence (AI) algorithms and/or machine learning algorithms in a 5G environment connected for the IoT.

The artificial intelligence speaker 400 may recognize a voice command of a user, and may transmit the voice command to one of the washing machine 100, the external server 200, or the user terminal 300. In addition, the artificial intelligence speaker 400 may receive information from one of the washing machine 100, the external server 200, or the user terminal 300, and may transmit the information to the user by voice.

Although FIG. 1 illustrates the artificial intelligence speaker 400 by way of example, in an actual use environment, in addition to the artificial intelligence speaker, a communication device capable of recognizing other voices, such as an artificial intelligence TV or an artificial intelligence refrigerator may be used. The user may transmit a command by voice through these devices, or may receive a voice response.

In the present embodiment, the user terminal 300 may be a desktop computer, a smartphone, a notebook, a tablet PC, a smart TV, a cell phone, a personal digital assistant (PDA), a laptop, a media player, a micro server, a global positioning system (GPS) device, an electronic book terminal, a digital broadcast terminal, a navigation device, a kiosk, an MP3 player, a digital camera, a home appliance, and other mobile or immobile computing devices operated by the user, but is not limited thereto.

Further, the user terminal 300 may be a wearable terminal such as a clock, eyeglasses, a hair band, and a ring having a communication function and a data processing function. However, the user terminal 300 is not limited thereto, and all kinds of terminals capable of web-browsing may also be applied to the present disclosure.

Meanwhile, although FIG. 1 separately illustrates the user terminal 300 illustrated as a smartphone and the artificial intelligence speaker 400, a user terminal may generally include an artificial intelligence speaker that interacts with the user.

The external server 200 may be a database server that provides big data required for applying various artificial intelligence algorithms and data for operating the washing machine 100. In addition, the external server 200 may include a web server or an application server, which allows the user to remotely control the operation of the washing machine 100 using a washing machine driving application or a washing machine driving web browser installed in the user terminal 300.

Meanwhile, although the external server 200 may be equipped with an artificial neural network for processing various pieces of information, such an artificial neural network may also be provided in the washing machine 100 itself.

Figure 2:
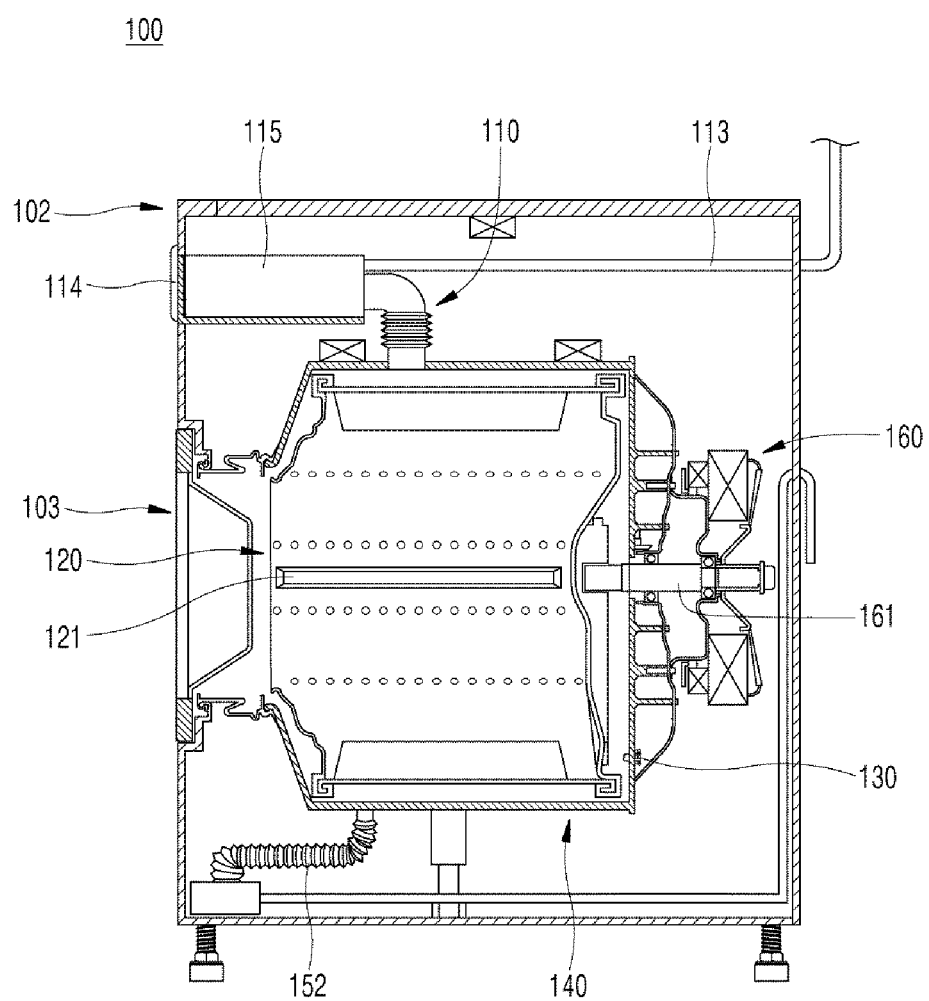
FIG. 2 is a sectional view showing a washing machine according to an embodiment of the present disclosure.

FIG. 2 is a sectional view showing a washing machine according to an embodiment of the present disclosure.

The washing machine 100 may include a cabinet 102 forming an exterior of the washing machine 100, a water supplier 110 configured to supply washing water for washing, a first tub 120 disposed inside the cabinet 102 and into which laundry is inserted, a detergent detection sensor 130 configured to detect physical properties of the washing water, a second tub 140 configured to accommodate the first tub 120, and a motor 160 configured to rotate the first tub 120.

The cabinet 102 has a front surface, side surfaces, a rear surface, a top surface, and a bottom surface that form the exterior of the washing machine 100, and a door 103 configured to open and close an inlet port of the first tub 120 may be formed in the front surface.

In addition, a control panel 114 may be disposed on the upper end of the front surface of the cabinet 102. The control panel 114 may be provided with a plurality of buttons for manipulating the operation of the washing machine 100, and may include a display for displaying the operating state of the washing machine 100.

The water supplier 110 supplying the washing water may include a water supply pipe 113 and a detergent drawer 115. The detergent drawer 115 is provided on the side of the control panel 114, and may have a portion configured to store detergent and a portion exposed to the front side which are integrally formed. The portion exposed to the front side may serve as a handle so as to allow the user to open and close the drawer 115.

The water supplied through the water supply pipe 113 is mixed with the detergent while passing through the detergent drawer 115, thereby being turned into washing water, and the washing water may be supplied to the first tub 120 containing the laundry through the second tub 140. Washing water used to perform washing in the first tub 120 and rinsing water used to perform rinsing may be discharged to the outside of the washing machine 100 through a drain pipe 152.

The first tub 120 is rotatably coupled to the second tub 140, and an opening is formed in the surface of the first tub 120 so that the liquid supplied to the second tub 140 may flow into the first tub 120, and the liquid in the first tub 120 may flow out to the second tub 140.

Thus, the first tub 120 may be a drum, and the second tub 140 may be an outer tub that accommodates the drum. In another embodiment, the first tub 120 may be referred to as an inner tub, and the second tub 140 may be referred to as an outer tub.

A plurality of lifters 121 may be installed in the first tub 120 such that the laundry is caught so that the laundry can be rotated together with the first tub 120. The laundry may be rotated together with the drum in the state of being caught by the lifters 121.

The motor 160 may be coupled to the first tub 120 through the rotation shaft 161, and the first tub 120 may be rotated according to the rotation of the motor 160.

In addition, although not illustrated in FIG. 2, a weight sensor may be disposed in the washing machine 100 to detect an amount of laundry loaded into the first tub 120. The weight sensor may be arranged to detect the weight of the first tub 120 in order to detect a change in the weight of the first tub 120, thereby detecting the amount of loaded laundry.

Meanwhile, the weight sensor to be used herein may be configured to determine the weight of laundry loaded into the first tub on the basis of the time taken for the motor for rotating the first hub 120 to reach the normal rpm after a driving signal is inputted to the motor, rather than detecting the weight of the first tub 120.

The washing machine 100 generally starts washing by loading laundry into a drum and introducing washing water into the drum. The washing machine 100 includes a movable inner tub (the first tub 120) into which laundry is loaded, and an outer tub (the second tub 140) surrounding the inner tub.

Here, the first tub 120 may be rotatably coupled to the second tub 140, and openings serving as water passing holes may be formed in the surface of the first tub 120. Water supplied to the first tub 120 flows out to the second tub 140 through a plurality of water passing holes formed in the first tub 120.

The washing machine 100 configured to adjust the operation thereof based on injected detergent according to an embodiment of the present disclosure may include a detergent detection sensor 130 coupled to the second tub 140. The detergent detection sensor 130 may be mounted at a location in the second tub 140 where water reaches.

In an embodiment, the detergent detection sensor 130 may be located near the bottom of the second tub 140 in which water remains for the longest time before being drained. In addition, the detergent detection sensor 130 may safely and stably operate by being coupled to the fixed second tub 140, rather than to the rotating first tub 120. The detergent detection sensor 130 may be detachably mounted on the second tub 140, and thus component replacement may be facilitated.

The detergent detection sensor 130 may penetrate through the second tub 140 to come into contact with the washing water in the second tub 140, and detect the physical properties of the washing water, such as the conductivity, turbidity, and temperature of the washing water.

The first tub 120 and the second tub 140 are connected to be in fluid communication such that the liquid in the first tub 120 flows out to the second tub 140, and the detergent detection sensor 130 is coupled to the second tub 140 to detect the physical properties of the liquid in the second tub 140. Thus, the detergent detection sensor 130 may detect the physical properties of the washing water and the rinsing water or the state of the rinsing water in the first tub 120.

A sensor of the washing machine 100 includes sensors for detecting elements necessary to determine the operation of the washing machine. In the present disclosure, unless otherwise specified, the sensor refers to the detergent detection sensor 130 that detects the physical properties of washing water or rinsing water.

The detergent detection sensor 130 may transmit, through a sensor MCU 132, an initial value of the detergent detection sensor measured when the water supply, drainage, and spin cycles are performed without detergent and laundry in order to check the operation state and the installation state of the washing machine when the washing machine 100 is installed in the user's home, and a value detected in the final rinse when the user performs the washing and rinsing cycles, to a washing machine processor. The washing machine processor may store, in a storage, the initial value of the detergent detection sensor 130 and the value of the detergent detection sensor at the final rinsing as reference values.

In an embodiment of the present disclosure, the washing machine 100 may include a washing machine processor that receives a digital signal from the detergent detection sensor 130 to determine the degree of contamination of the washing tank. The processor may control the overall operation of the washing machine, including washing, rinsing, and spin cycles of the washing machine 100.

The processor may determine the amount of detergent that is additionally introduced into washing water into which additional laundry has been introduced based on the conductivity, turbidity, and temperature of the washing water detected by the detergent detection sensor 130, and may set an operation mode of the washing machine based on the determined amount of detergent.

Specifically, the detergent detection sensor 130 may include an optical sensor configured to detect the transmittance of light in order to detect the turbidity of washing water, a temperature sensor configured to detect the temperature of washing water, a conductivity sensor configured to detect the conductivity of washing water, and a sensor MCU including a correction algorithm configured to correct the value of conductivity and the value of transmittance depending on the temperature.

The detergent detection sensor 130 may be a unit obtained by integrating, into a single module, all the sensors capable of detecting conductivity, turbidity, and temperature, and a sensor MCU capable of correcting signals detected from the sensors and converting the detected signals into digital signals.

The sensor MCU may convert analog signals detected by the sensors into digital signals. Consequently, digital signals, rather than analog signals, may be transmitted to the processor of the washing machine. Accordingly, it is possible to prevent signal disturbance, which may occur when analog signals are transmitted from the sensors.

The optical sensor may set the turbidity of washing water. Specifically, light may be emitted by an LED of the optical sensors, and the emitted light may be transmitted to a phototransistor through washing water. The optical signal transmitted to the phototransistor may be data used to set the turbidity of washing water.

That is, since the optical sensor detects the degree of transmission of light, a concept opposite of the transmittance of light is indicated as turbidity. In the case in which the transmittance of light in a liquid is high, the turbidity is low, and conversely, in the case in which the transmittance of light in a liquid is low, the turbidity is high. When the amount of matter suspended in a liquid is large, turbidity therefore increases. Consequently, it is possible to estimate the amount and kind of detergent contained in washing water based on turbidity measured by the optical sensor. However, since the turbidity may vary according to the temperature of the liquid even if the same amount of suspended matter is present, the measured turbidity may need to be corrected by the temperature for correct estimation.

The conductivity sensor is a sensor configured to detect the magnitude of a current that flows when uniform voltage is applied to two electrodes, in order to measure the conductivity of washing water. The conductivity sensor may be referred to as an electrode sensor, and since conductivity is influenced by the presence of ions in water and the total concentration of the ions, conductivity may indicate the amount of substance dissolved in washing water.

Therefore, the type or amount of detergent dissolved in the washing water may be estimated based on the conductivity of the washing water. However, since the conductivity of a solution is influenced by the temperature of the solution in addition to the dissolved substance, the measured conductivity may need to be corrected on the basis of the temperature for accurate estimation.

The temperature sensor is for measuring the temperature of the liquid, and the information on the temperature of the washing water is used not only for controlling the washing cycle, but also for correcting the conductivity and turbidity values in order to more accurately estimate the amount and type of detergent as described above.

The detergent detection sensor 130 may correct turbidity measured by the optical sensor and conductivity measured by the conductivity sensor based on the temperature value measured by the temperature sensor, as described above.

That is, the detergent detection sensor 130 may transmit, to the washing machine processor, the turbidity and conductivity values to be measured at a standard temperature rather than the measured turbidity and conductivity values themselves, and thus the washing machine processor is capable of more accurately estimating the amount of detergent without being affected by the temperature.

Figure 3:
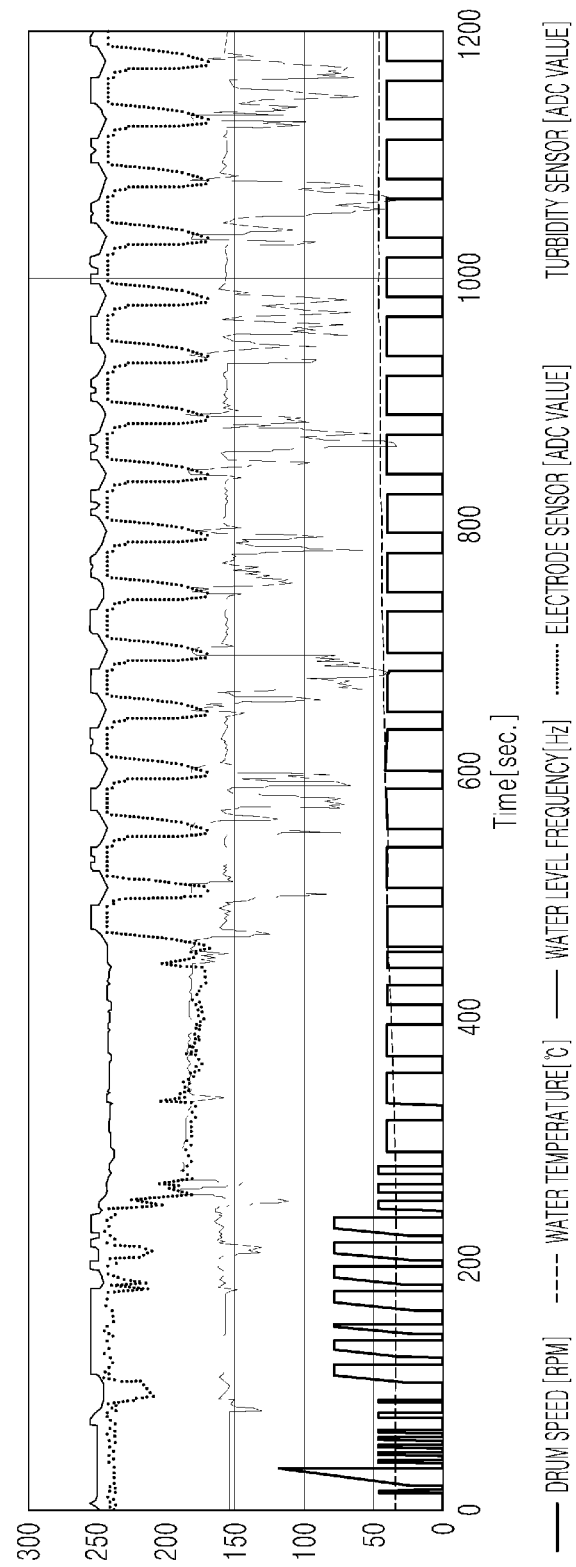
FIG. 3 is a view illustrating a signal detected based on laundry that is additionally introduced into the washing machine according to the embodiment of the present disclosure.

FIG. 3 is a view describing a signal detected based on laundry that is additionally introduced into the washing machine according to the embodiment of the present disclosure Variable (a) of FIG. 3 shows the motion of a motor (RPM) during a washing cycle after laundry is additionally introduced into the washing machine.

For example, it is shown that at 0 sec of the washing operation being performed, the motor accelerates, and at about 100 sec, the motor motions become uniform. At this time, it is shown that, when laundry is additionally introduced, the motion of the motor changes. It may be estimated that laundry is additionally introduced after about 250 sec based on the change of the graph, and it can be seen that the motions of the motor become uniform to perform washing after about 500 sec.

Variable (b) of FIG. 3 shows a change in temperature of water in the tub during a washing cycle.

Specifically, it is shown that from 0 sec of the washing operation being performed, the temperature of water continuously increases while the washing cycle continues after the laundry is additionally introduced.

Variable (c) of FIG. 3 shows a water level frequency during the washing cycle.

As shown in the figure, a water level frequency is changed during a predetermined amount of time after the washing cycle is commenced and the water level greatly increases after about 250 sec of additional laundry being introduced. Subsequently, it is shown that a change in water level frequency occurs at uniform intervals after about 500 sec.

Variable (d) of FIG. 3 shows conductivity (an ADC value) during the washing cycle. It is shown that the amount of substance dissolved in the washing water increases and decreases in proportion to the motion of the motor during the washing cycle due to the conductivity shown in the figure.

Variable (e) of FIG. 3 shows turbidity (an ADC value) during the washing cycle.

As shown in the figure, turbidity decreases as the motion of the motor increases during the washing cycle, and turbidity increases as the motion of the motor decreases during the washing cycle.

That is, it is possible estimate whether the motor is operating to perform washing or whether the operation of the motor is temporarily interrupted based on a change in conductivity value and turbidity value.

Figure 4:
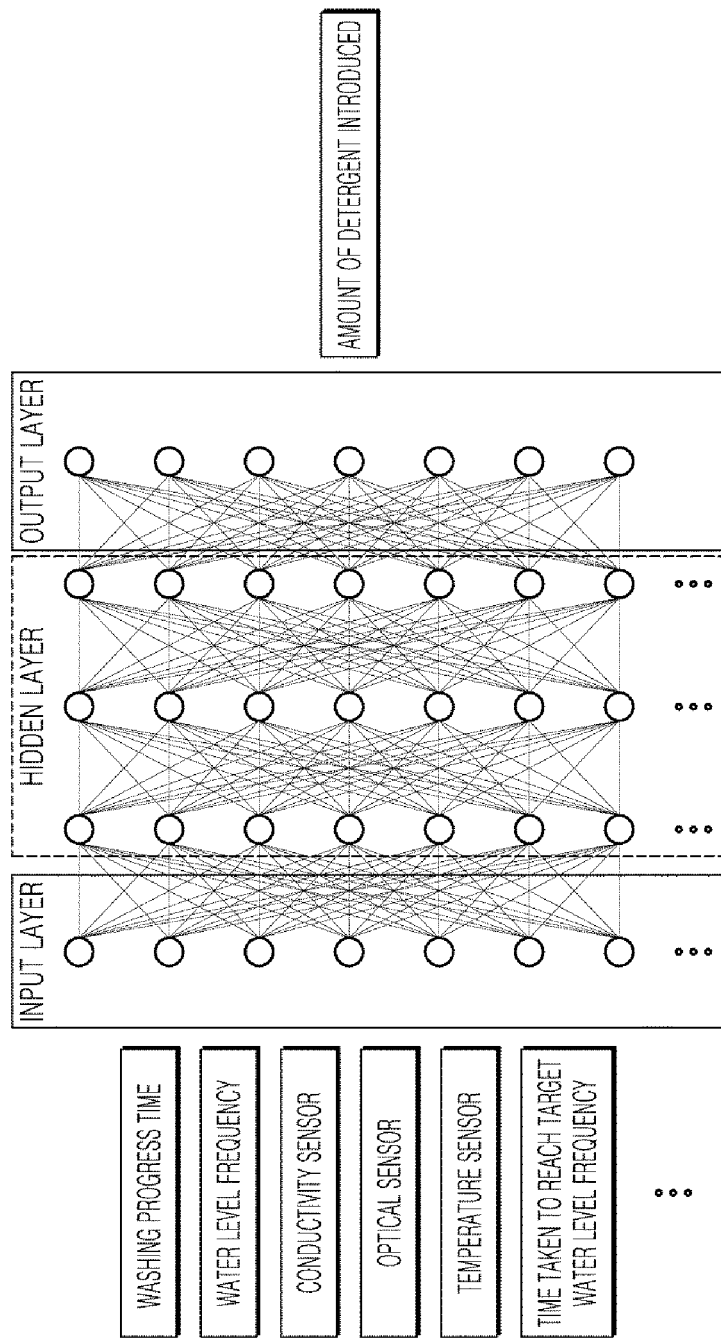
FIG. 4 is a view illustrating a neural network model configured to estimate the type of washing and the amount of detergent based on additional laundry according to an embodiment of the present disclosure.

FIG. 4 is a view describing a neural network model configured to estimate the type of washing and the amount of detergent based on additional laundry according to an embodiment of the present disclosure.

In order to more accurately determine the amount of detergent that is additionally introduced into washing water into which additional laundry has been introduced, a deep neural network model, which is a kind of artificial intelligence, may be used.

Artificial intelligence (AI) is an area of computer engineering science and information technology that studies methods to make computers mimic intelligent human behaviors such as reasoning, learning, self-improving, and the like, or how to make computers mimic such intelligent human behaviors.

In addition, artificial intelligence does not exist on its own, but is rather directly or indirectly related to a number of other fields in computer science. In recent years, there have been numerous attempts to introduce an element of AI into various fields of information technology to solve problems in the respective fields.

Machine learning is an area of artificial intelligence that includes the field of study that gives computers the capability to learn without being explicitly programmed.

Specifically, the machine learning can be a technology for researching and constructing a system for learning, predicting, and improving its own performance based on empirical data and an algorithm for the same. The algorithms of the machine learning take a method of constructing a specific model in order to obtain the prediction or the determination based on the input data, rather than performing the strictly defined static program instructions.

Numerous machine learning algorithms have been developed for data classification in machine learning. Representative examples of such machine learning algorithms for data classification include, for example, a decision tree, a Bayesian network, a support vector machine (SVM) and an artificial neural network (ANN).

Decision tree refers to an analysis method that uses a tree-like graph or model of decision rules to perform classification and prediction.

Bayesian network may include a model that represents the probabilistic relationship (conditional independence) among a set of variables. Bayesian network may be appropriate for data mining via unsupervised learning.

SVM may include a supervised learning model for pattern detection and data analysis, heavily used in classification and regression analysis.

An ANN is a data processing system modeled after the mechanism of biological neurons and interneuron connections, in which a number of neurons, referred to as nodes or processing elements, are interconnected in layers.

ANNs are models used in machine learning and may include statistical learning algorithms conceived from biological neural networks (particularly of the brain in the central nervous system of an animal) in machine learning and cognitive science.

ANNs may refer generally to models that have artificial neurons (nodes) forming a network through synaptic interconnections, and acquires problem-solving capability as the strengths of synaptic interconnections are adjusted throughout training.

The terms 'artificial neural network' and 'neural network' may be used interchangeably herein.

An ANN may include a number of layers, each including a number of neurons. In addition, the ANN may include the synapse for connecting between neuron and neuron.

The ANN may be defined by the following three factors: (1) a connection pattern between neurons on different layers; (2) a learning process that updates synaptic weights; and (3) an activation function generating an output value from a weighted sum of inputs received from a previous layer.

ANNs may include, but are not limited to, network models such as a deep neural network (DNN), a recurrent neural network (RNN), a bidirectional recurrent deep neural network (BRDNN), a multilayer perception (MLP), and a convolutional neural network (CNN).

An ANN may be classified as a single-layer neural network or a multi-layer neural network, based on the number of layers therein.

A general single-layer neural network may include an input layer and an output layer.

In addition, a general the multi-layer neural network may include an input layer, one or more hidden layers, and an output layer.

The input layer receives data from an external source, and the number of neurons in the input layer is identical to the number of input variables. The hidden layer is located between the input layer and the output layer, and receives signals from the input layer, extracts features, and feeds the extracted features to the output layer. The output layer receives a signal from the hidden layer and outputs an output value based on the received signal. The input signals between the neurons are summed together after being multiplied by corresponding connection strengths (synaptic weights), and if this sum exceeds a threshold value of a corresponding neuron, the neuron can be activated and output an output value obtained through an activation function.

A deep neural network with a plurality of hidden layers between the input layer and the output layer may be a representative artificial neural network which enables deep learning, which is one machine learning technique.

An ANN may be trained using training data. Here, the training may refer to the process of determining parameters of the ANN by using the training data, to perform tasks such as classification, regression analysis, and clustering of inputted data. Representative examples of parameters of the ANN may include synaptic weights and biases applied to neurons.

Throughout the present specification, an ANN trained using training data may classify or cluster inputted data according to a pattern within the inputted data.

Throughout the present specification, an ANN trained using training data may be referred to as a trained model.

Hereinbelow, a learning method of the ANN will be described.

The learning paradigms, in which an artificial neural network operates, may be classified into supervised learning, unsupervised learning, semi-supervised learning, and reinforcement learning.

Supervised learning is a machine learning method that derives a single function from the training data.

Among the functions that may be thus derived, a function that outputs a continuous range of values may be referred to as a regressor, and a function that predicts and outputs the class of an input vector may be referred to as a classifier.

In supervised learning, an ANN may be trained with training data that has been given a label.

Here, the label may refer to a target answer (or a result value) to be guessed by the ANN when the training data is inputted to the ANN.

Throughout the present specification, the target answer (or a result value) to be guessed by the ANN when the training data is inputted may be referred to as a label or labeling data.

Throughout the present specification, assigning one or more labels to training data in order to train an ANN may be referred to as labeling the training data with labeling data.

Training data and labels corresponding to the training data together may form a single training set, and as such, they may be inputted to an ANN as a training set.

The training data may exhibit a number of features, and the training data being labeled with the labels may be interpreted as the features exhibited by the training data being labeled with the labels. In this case, the training data may represent a feature of an input object as a vector.

Using training data and labeling data together, the artificial neural network may derive a correlation function between the training data and the labeling data. Then, through evaluation of the function derived from the ANN, a parameter of the ANN may be determined (optimized).

Unsupervised learning is a machine learning method that learns from training data that has not been given a label.

More specifically, unsupervised learning may be a learning method that trains an ANN to discover a pattern within given training data and perform classification by using the discovered pattern, rather than by using a correlation between given training data and labels corresponding to the given training data.

Examples of unsupervised learning may include clustering and independent component analysis.

Examples of the ANN using the unsupervised learning may include a generative adversarial network (GAN) and an autoencoder (AE).

The GAN is a machine learning method in which two different artificial intelligences, a generator and a discriminator, improve performance through competing with each other.

The generator may be a model creating new data that generate new data based on true data.

The discriminator may be a model recognizing patterns in data that determines whether inputted data is from the true data or from the new data generated by the generator.

Furthermore, the generator may receive and learn data that has failed to fool the discriminator, while the discriminator may receive and learn data that has succeeded in fooling the discriminator. Accordingly, the generator may evolve so as to fool the discriminator as effectively as possible, while the discriminator may evolve so as to distinguish, as effectively as possible, between the true data and the data generated by the generator.

An auto-encoder (AE) is a neural network which aims to reconstruct its input as output.

More specifically, AE may include an input layer, at least one hidden layer, and an output layer.

Since the number of nodes in the hidden layer is smaller than the number of nodes in the input layer, the dimensionality of data is reduced, thus leading to data compression or encoding.

Furthermore, the data outputted from the hidden layer may be inputted to the output layer. In this case, since the number of nodes in the output layer is greater than the number of nodes in the hidden layer, the dimensionality of the data increases, thus data decompression or decoding may be performed.

Furthermore, in the AE, the inputted data may be represented as hidden layer data as interneuron connection strengths are adjusted through learning. The fact that when representing information, the hidden layer is able to reconstruct the inputted data as output by using fewer neurons than the input layer may indicate that the hidden layer has discovered a hidden pattern in the inputted data and is using the discovered hidden pattern to represent the information.

Semi-supervised learning is machine learning method that makes use of both labeled training data and unlabeled training data.

One semi-supervised learning technique involves reasoning the label of unlabeled training data, and then using this reasoned label for learning. This technique may be used advantageously when the cost associated with the labeling process is high.

Reinforcement learning may be based on a theory that given the condition under which a reinforcement learning agent can determine what action to choose at each time instance, the agent may find an optimal path based on experience without reference to data.

Reinforcement Learning may be performed primarily by a Markov decision process (MDP).

Markov decision process consists of four stages: first, an agent is given a condition containing information required for performing a next action; second, how the agent behaves in the condition is defined; third, which actions the agent should choose to get rewards and which actions to choose to get penalties are defined; and fourth, the agent iterates until future reward is maximized, thereby deriving an optimal policy.

An ANN is characterized by features of its model, the features including, for example, an activation function, a loss function or cost function, a learning algorithm, and an optimization algorithm. Also, the hyperparameters are set before learning, and model parameters may be set through learning to specify the architecture of the ANN.

For instance, the structure of an ANN may be determined by a number of factors, including, for example, the number of hidden layers, the number of hidden nodes included in each hidden layer, input feature vectors, and target feature vectors.

Hyperparameters may include various parameters which need to be initially set for learning, much like the initial values of model parameters. Also, the model parameters may include various parameters sought to be determined through learning.

For instance, the hyperparameters may include initial values of weights and biases between nodes, mini-batch size, iteration number, learning rate, and so forth. Furthermore, the model parameters may include, for example, a weight between nodes and a bias between nodes.

Loss function may be used as an index (reference) in determining an optimal model parameter during the learning process of an ANN. Learning in the ANN involves a process of adjusting model parameters so as to reduce the loss function, and the purpose of learning may be to determine the model parameters that minimize the loss function.

The loss functions typically use means squared error (MSE) or cross entropy error (CEE), but the present disclosure is not limited thereto.

A cross-entropy error may be used when a true label is one-hot encoded. The one-hot encoding may include an encoding method in which among given neurons, only those corresponding to a target answer are given 1 as a true label value, while those neurons that do not correspond to the target answer are given 0 as a true label value.

In machine learning or deep learning, learning optimization algorithms may be used to minimize a cost function, and examples of such learning optimization algorithms may include gradient descent (GD), stochastic gradient descent (SGD), momentum, Nesterov accelerate gradient (NAG), Adagrad, AdaDelta, RMSProp, Adam, and Nadam.

The GD includes a method that adjusts model parameters in a direction that decreases the output of a cost function by using a current slope of the cost function.

The direction in which the model parameters are to be adjusted may be referred to as a step direction, and a size to be adjusted may be referred to as a step size.

Here, the step size may mean a learning rate.

The GD obtains a slope of the cost function through use of partial differential equations, using each of model parameters, and updates the model parameters by adjusting the model parameters by a learning rate in the direction of the slope.

The SGD may include a method that separates the training dataset into mini batches, and by performing gradient descent for each of these mini batches, increases the frequency of gradient descent.

Adagrad, AdaDelta and RMSProp may include methods that increase optimization accuracy in SGD by adjusting the step size. In the SGD, the momentum and NAG may also include methods that increase optimization accuracy by adjusting the step direction. Adam may include a method that combines momentum and RMSProp and increases optimization accuracy in SGD by adjusting the step size and step direction. Nadam may include a method that combines NAG and RMSProp and increases optimization accuracy by adjusting the step size and step direction.

Learning rate and accuracy of an artificial neural network may include not only the structure and learning optimization algorithms of the artificial neural network but also the hyperparameters thereof. Therefore, in order to obtain a good learning model, it is important to choose a proper structure and learning algorithms for the artificial neural network, but also to choose proper hyperparameters.

In general, the hyperparameters may be set to various values experimentally to learn artificial neural networks, and may be set to optimal values that provide stable learning rate and accuracy of the learning result.

That is, as shown in FIG. 4, in the case in which each sensor value and a pattern in which the sensor value is changed are trained in a deep learning algorithm, it is possible to more accurately estimate the amount of detergent that is additionally introduced when additional laundry is introduced.

Various methods of generating a deep neural network model used in the embodiment of the present disclosure may be present. In the case of supervised learning, the following training processes may be performed as preliminary work.

In order to generate a neural network model capable of estimating the amount of detergent that is additionally introduced into washing water, a washing machine manufacturer or a learning model generator introduces additional laundry, and records conductivity and turbidity data measured during the operation of the washing machine. In addition, the washing machine manufacturer or the learning model generator labels the amount of detergent that is additionally introduced for the relevant conditions at each recorded point of data. As a result, training data including the conductivity and the turbidity measured in the washing water into which the additional laundry has been introduced and the amount of detergent introduced into the washing water as labels may be prepared.

The neural network model may be trained on the basis of the training data prepared as above, and as a result of the training, a deep neural network model capable of estimating the amount of detergent injected in the washing water may be obtained based on the conductivity and turbidity of the washing water.

Data used in the training step may further include temperature data, and the neural network model trained based on the data may estimate the amount of detergent that is additionally introduced into washing water into which additional laundry has been introduced based on the conductivity, turbidity, and temperature of the washing water.

In addition, a different kind of data related to the physical properties of washing water may be added. As a result, the physical properties of washing water detected using various sensors may be received, and a model configured to detect the amount of detergent that is additionally introduced into washing water into which additional laundry has been introduced may be generated.

In the case in which the amount of detergent that is additionally introduced into washing water into which additional laundry has been introduced is accurately determined through the pre-trained neural network model, as described above, the processor of the washing machine may more appropriately adjust the operation of the washing machine into which the additional laundry has been introduced based on a determined situation.

Figure 5:
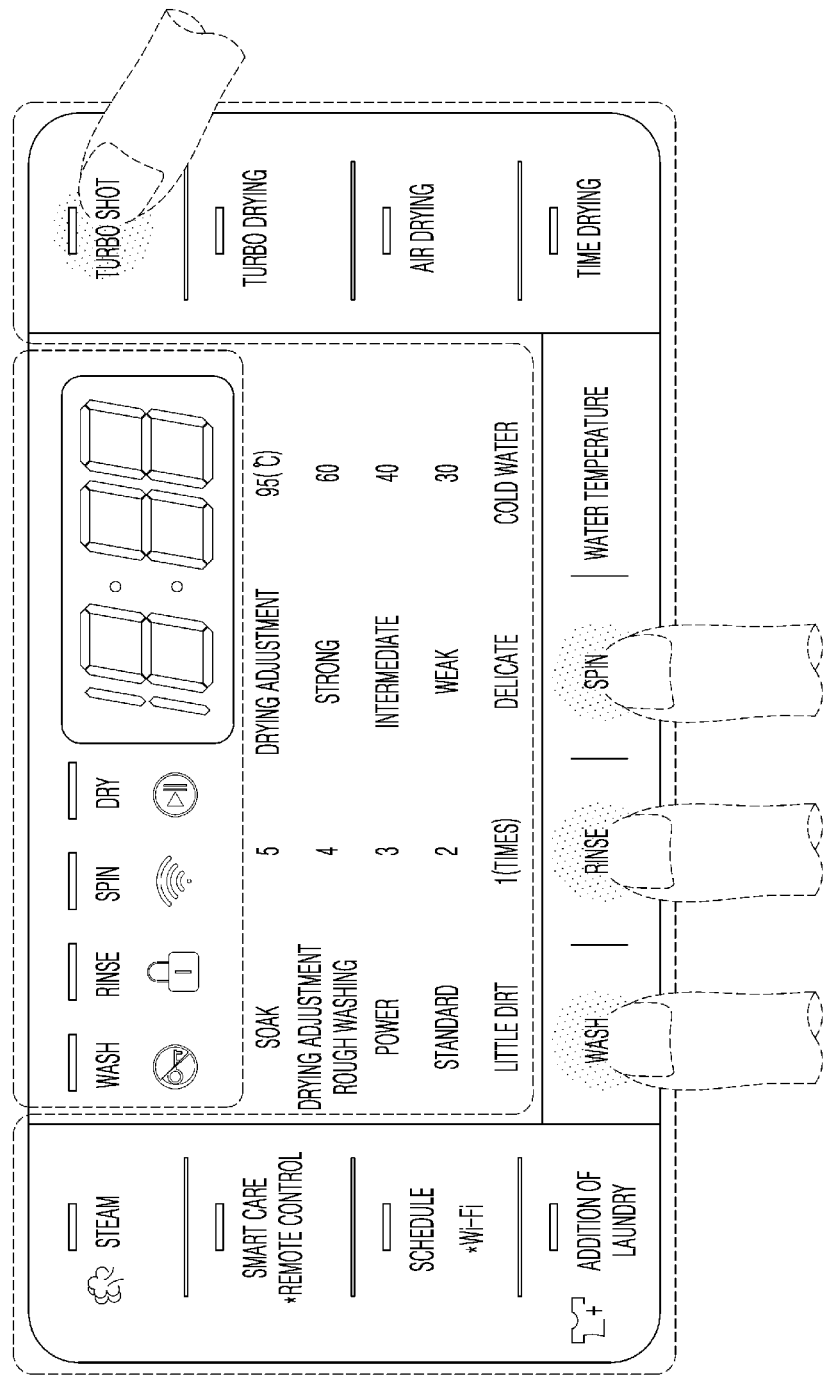
FIG. 5 is a view illustrating the operation of the washing machine according to the embodiment of the present disclosure.

FIG. 5 is a view describing the operation of the washing machine according to the embodiment of the present disclosure.

A user may manually determine which cycle is to be performed and under what conditions the washing is to be performed by pushing one of wash, rinse, and spin cycle buttons in the control panel 114 of the washing machine 100. However, most users do not know the proper cycle conditions in the environment in which they perform washing.

Therefore, in general, the washing machine 100 has a preset washing operation algorithm, and when a washing start button is pushed after laundry is loaded and specific conditions are selected, the washing machine processor detects the amount of laundry, and plans water supply amount, washing time, washing motion, rinsing time, rinsing method, spin cycle time, and spin cycle method based on the detected amount of laundry and the inputted specific conditions.

The operation of the washing machine may be mainly divided into a washing cycle, a rinsing cycle, and a spinning cycle. How much time is assigned to each step, how water supply and drainage are performed in each step, and the rotational speed of the drum in each step are set based on, for example, the amount of laundry that is initially introduced, the amount of laundry that is additionally introduced during a washing cycle, a washing target set by a user and the amount of detergent that is introduced.

Once the operation plan of the washing machine is determined, the control panel 114 may display detailed washing conditions (such as total washing machine operation time, soaking frequency, rough-washing frequency, washing intensity, and rinsing frequency) according to the plan, and the user may thus be informed of the operation plan of the washing machine.

Figure 6:
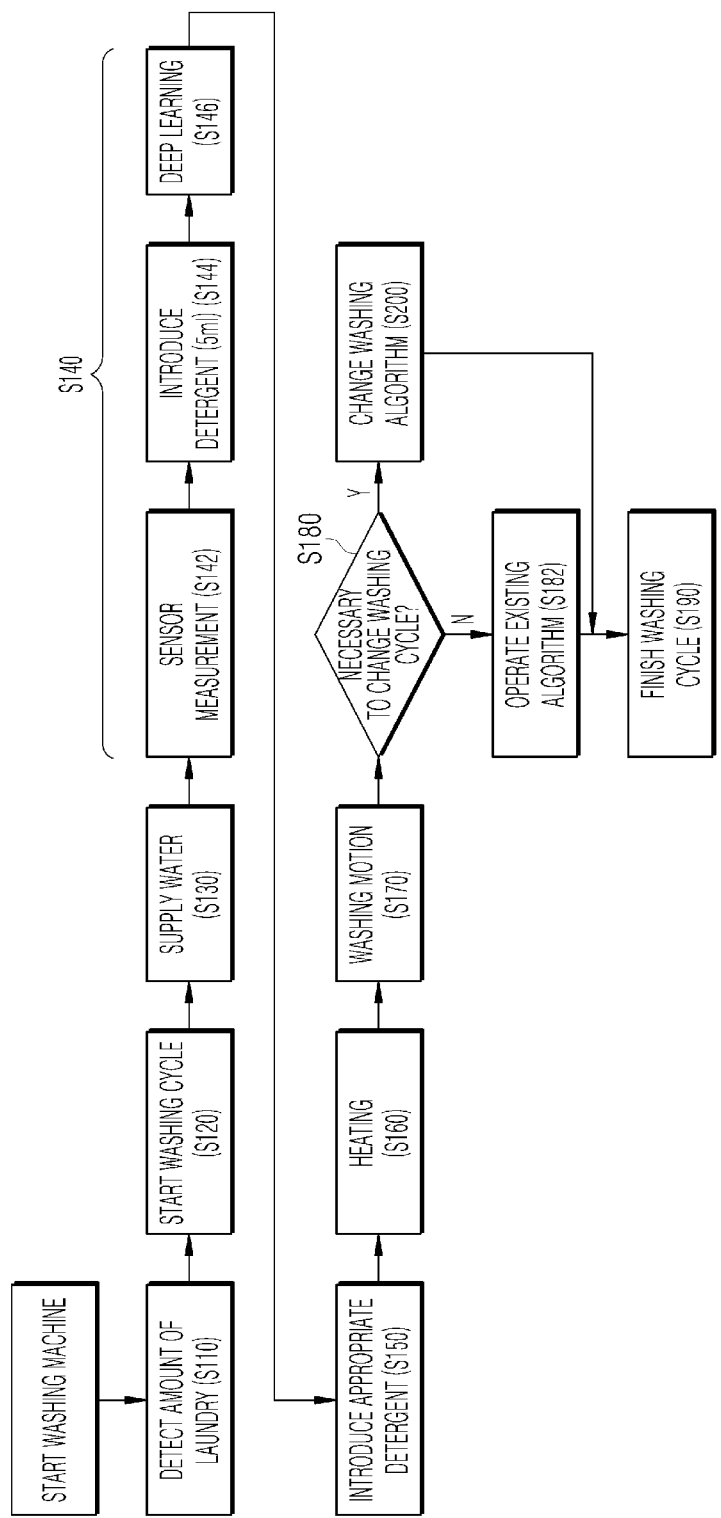
FIG. 6 is a view illustrating a washing cycle of the washing machine according to the embodiment of the present disclosure.
Figure 7:
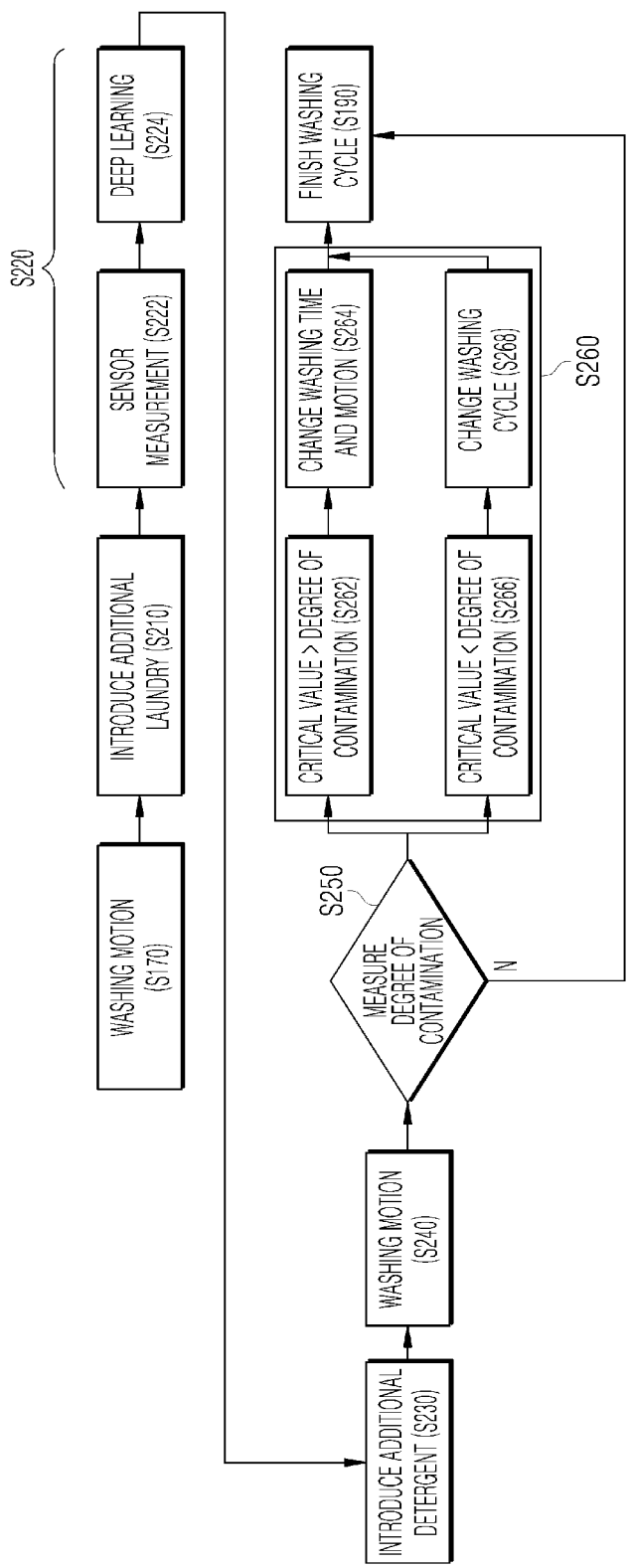
FIGS. 7 to 9 are flowcharts illustrating a washing cycle performed when additional laundry is introduced into the washing machine according to the embodiment of the present disclosure.
Figure 8:
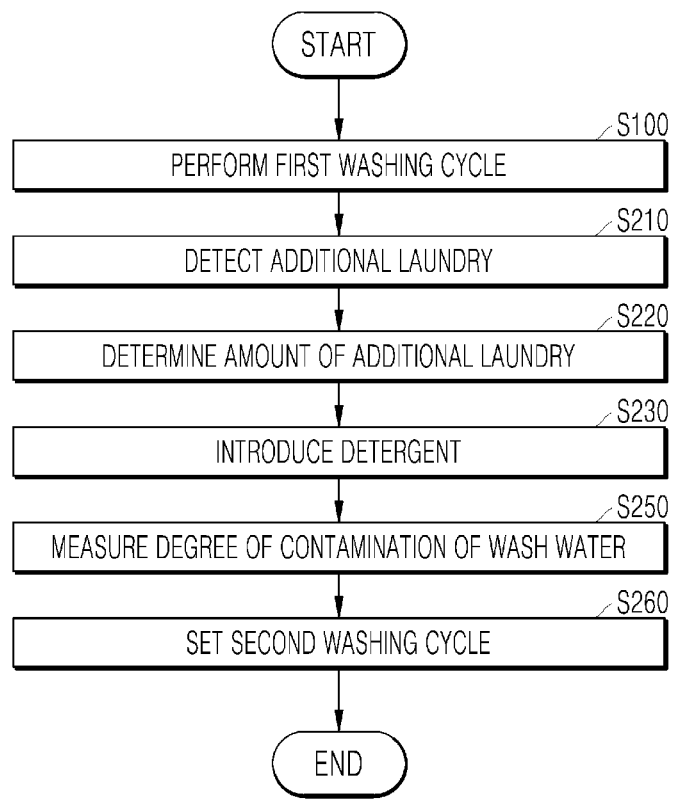
Figure 9:
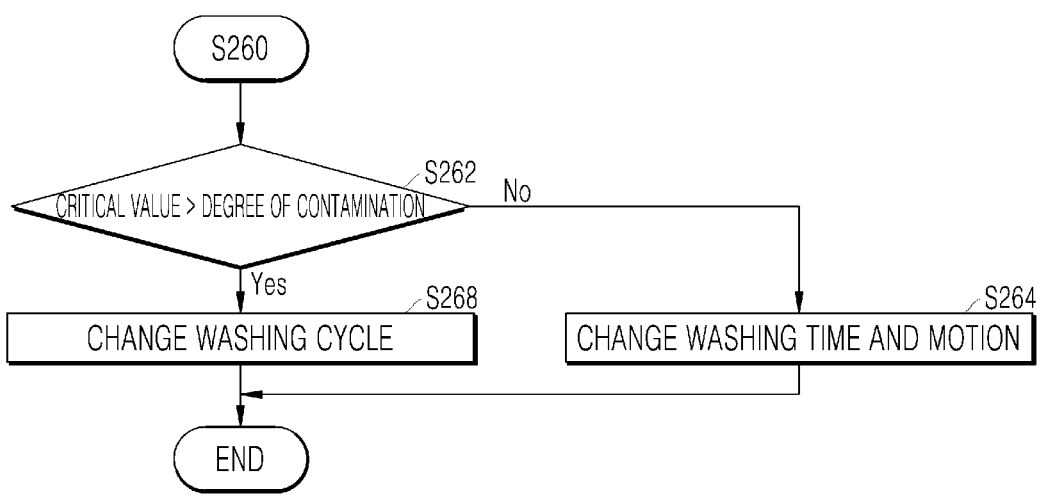

FIG. 6 is a view describing a washing cycle of the washing machine according to the embodiment of the present disclosure. FIGS. 7 to 9 are flowcharts describing a washing cycle performed when additional laundry is introduced into the washing machine according to the embodiment of the present disclosure.

The user may open the door 103 of the washing machine 100, may load laundry into the first tub 120, and may then add detergent. Subsequently, the user may select desired washing intensity through the control panel 114, and may push the washing start button to perform a first washing cycle (S100).

Specifically, the washing machine 100 may detect the amount of laundry loaded into the first tub 120 (cloth amount) using a weight sensor while driving the first tub 120 by a small amount (S110). Based on the detected amount of laundry and the washing option selected by the user, the washing machine processor may determine and start the washing cycle (S120). Here, the determined washing cycle may be an overall plan of the washing operation or a portion of the washing cycle temporarily set before the amount of detergent introduced into washing water is detected.

Based on the determined washing cycle, the washing machine 100 may supply water through the water supply pipe 113, and washing water and detergent may be mixed in the detergent drawer 115 and supplied into the second tub 140 (S130). The washing water supplied to the second tub 140 may be supplied into the first tub 120 through the openings in the surface of the first tub 120.

In the case of a top load washing machine rather than a drum washing machine, washing water may be directly supplied into an inner tub into which laundry is loaded, and the washing water may be supplied to an outer tub through the openings in the inner tub.

Here, it should be noted that "supplying washing water to the first tub 120 by a water supplier 110" includes not only "directly supplying the washing water to the first tub 120," but also "supplying the washing water to the first tub 120 through the second tub 140."

After the washing water is supplied, the amount of detergent that is introduced into washing water into which additional laundry has been introduced may be estimated based on detection by the detergent detection sensor 130 (S140).

To this end, the detergent detection sensor 130 may primarily measure a first conductivity and a first turbidity of washing water (S142). The measured first conductivity and first turbidity may be inputted to a neural network model, which is a kind of machine learning described above (S146). Upon receiving the first conductivity and the first turbidity as input values, the neural network model may determine the amount of detergent that is introduced into washing water into which laundry has been introduced (S150).

In this process, a small amount of detergent may be introduced in order to measure the degree of contamination of the washing water (S144). The small amount of detergent may be an amount in which washing is not sufficiently performed but in which contaminants of laundry are dissolved in washing water (for example, 5 ml).

The process of introducing the small amount of detergent may be changed depending on conditions, and the amount of detergent that is introduced may be changed depending on conditions.

Here, the detergent detection sensor 130 may further detect a first temperature of the washing water (S160). The first conductivity and the first turbidity input to the neural network model may be corrected based on the detected first temperature. In addition, the neural network model may estimate the amount of detergent based on the first conductivity and the first turbidity corrected based on the detected first temperature.

Here, when the estimated amount of detergent is less than a predetermined threshold, the washing machine processor may generate a signal requesting additional injection of detergent, and may transmit the request signal to the user through the display or the transceiver of the washing machine 100.

Here, the predetermined threshold may be the amount of detergent for each type of detergent required for each weight section of the laundry, and the threshold may be changed on the basis of the amount of laundry detected by the weight sensor.

For example, if the weight of laundry is 8 kg and the amount of powder detergent estimated using the neural network model is 20 g, the washing machine processor may notify the user that 50 g of detergent should be additionally injected on the basis of a table for the suitable amount of detergent for each weight section of laundry.

If it is determined that no detergent has been injected, the washing machine processor may notify the user through the display or the transceiver that no detergent has been injected, and if there is no feedback from the user, the washing machine processor may operate the washing machine while shortening the time of the washing cycle.

In addition, the processor of the washing machine may estimate the kind of detergent that is introduced into the washing machine based on, for example, the measured first turbidity, the first conductivity and the first temperature, and the amount of laundry. For example, since different kinds of washing may be used such as when the washing machine performing the washing cycle is a drum type washing machine or when the washing machine performing the washing cycle is a top-loading type washing machine, the user may be informed of this information.

The processor of the washing machine may perform a first washing cycle such that the washing algorithm and the washing cycle are suitable for the kind and amount of detergent estimated from the previously set plan (S170).

Subsequently, the processor of the washing machine may determine whether the washing cycle condition is changed, for example, when additional laundry is introduced (S180). If the previously determined washing cycle does not need to be changed, washing is performed according to the existing algorithm (S182), and if it is determined that a change is required in the washing cycle, the washing machine processor may change the washing algorithm (S200).

Specifically, upon determining that additional laundry is introduced and thus that the washing cycle needs to be changed, the processor of the washing machine may set a second washing cycle to be changed in further consideration of the amount of detergent that is additionally introduced into wash water and the amount of laundry.

Specifically, referring to FIGS. 7 to 9, additional laundry may be introduced into the first tub 120 during the washing cycle after detection of the amount of laundry (S210). When the additional laundry is introduced, the amount of the additional laundry is detected through the weight sensor (S220).

For example, the additional laundry may be detected through a laundry amount detection sensor (S222). The measured additional laundry may be inputted to a neural network model, which is a kind of machine learning (S224). Upon receiving the amount of the additional laundry as an input value, the neural network model may determine the amount of detergent that is additionally introduced for washing.

The amount of detergent that is additionally introduced may be proportional to the amount of the additional laundry. Alternatively, detergent may be additionally introduced using a method of additionally introducing a small amount of detergent irrespective of the additional laundry and further adding the amount of detergent depending on the degree of washing water, a description of which will follow.

When the additional detergent is introduced, the washing machine may progress (S240). During the operation of the washing machine, the detected amount of the additional laundry and the degree of contamination of the additional laundry may be determined in order to set the washing cycle (S250). Here, setting the washing cycle (S260) may be changing the condition of the first washing cycle that has been performed previously or resetting the first washing cycle.

Specifically, in the case in which the amount of the additional laundry that has been introduced is estimated, an appropriate amount of detergent may be introduced into the washing water to measure a second conductivity and a second turbidity in order to determine the degree of contamination of the washing water into which the additional laundry has been introduced. The measured second conductivity and the measured second turbidity may be inputted to a neural network model, which is a kind of machine learning described above.

Here, the detergent detection sensor 130 may also detect a second temperature. The second turbidity and the second conductivity may be corrected based on the detected second temperature.

The measured degree of contamination of the washing water may be less than a predetermined threshold value (S262). In this case, the operation condition of the first washing cycle performed by the washing machine 100 may be changed (S264).

Here, changing the operation condition of the first washing cycle means increasing the operation time of at least one of the washing operation, the rinsing operation, or the spinning operation of the first washing cycle.

Alternatively, the operation time of the first washing cycle may be maintained, and the intensity of motion of the tub may be increased in order to rapidly reduce the degree of contamination.

For example, in the case in which the weight of existing laundry is 8 kg and the weight of additional laundry that has been additionally introduced is 4 kg, the processor of the washing machine informs the user that at least one of washing course of washing, rinsing, or spinning must be added based on a pre-stored table of the operation conditions of the washing machine appropriate for the weight of laundry, or automatically adds a washing course.

Alternatively, in the case in which the washing cycle is performed based on the existing course, the processor of the washing machine may inform the user through the display or the transceiver that the washing cycle is not changed, and may correspondingly inform the user that the washing cycle is performed in the state in which the intensity of motion of the tub is increased in order to remove the degree of contamination of the additional laundry.

In contrast, in the case in which the degree of contamination of the washing water is equal to or greater than a predetermined threshold value, the processor of the washing machine resets the first washing cycle (S266 and S268).

Resetting the first washing cycle means changing the sequence of the washing operation, the rinsing operation, and the spinning operation in the first washing cycle performed by the washing machine 100, and adding at least one of the washing operation or the spinning operation.

That is, a re-performance of the washing course means interrupting the first washing cycle that is being performed, performing intermediate spinning, and resetting the overall course including the washing operation, the rinsing operation, and the spinning operation such that washing is performed again from the beginning.

Meanwhile, before the degree of contamination is measured, when additional detergent is introduced, a first neural network model may be applied to the amount of additional laundry in order to estimate the amount of detergent to be additionally introduced.

Here, the first neural network model may be one of the neural network models pre-trained using training data including amounts of additional laundry labeled with the amount of detergent to be additionally introduced.

Meanwhile, when the first washing cycle is reset, the remainder of the washing time set in the first washing cycle may be measured. Here, the set washing time is the total washing time set when the first washing cycle is performed, and the measured remaining washing time means the rest of the total washing time.

The remaining washing time may be measured, and the difference between estimated washing time based on the estimated value of the degree of contamination of washing water and the washing time of the first washing cycle may be measured. In the case in which the measured difference in washing time of the first washing cycle is greater than a threshold value, the processor of the washing machine may inform the user terminal about the extension of the washing time.

Here, the fact that the measured difference in washing time of the first washing cycle is greater than the threshold value means that the washing time of the first washing cycle remains short at the point in time at which additional laundry is introduced. Since the washing time of the first washing cycle remains short, additional washing time is applied in order to remove contaminants from the additional laundry.

In addition, such information is reported through the user terminal 300 such that the user can confirm additional laundry washing information in real time.

In contrast, the difference between the estimated washing time based on the estimated value of the degree of contamination of washing water and the washing time of the first washing cycle may be equal to or less than the threshold value. Specifically, this means that it is possible to wash all of the laundry including the additional laundry within the washing time of the first washing cycle.

In this case, the intensity of motion of the tub is increased such that all of the laundry can be washed within the washing time of the first washing cycle.

When the additional detergent is introduced into the tub, additional washing water may be introduced into the tub. When the additional laundry is introduced, additional washing water may also be introduced. Furthermore, the additional washing water may be introduced in proportion to laundry that is additionally introduced before a second washing cycle is set. Alternatively, the second washing cycle may be set, and then the additional washing water may be introduced by the amount corresponding to the set second washing cycle. In the following description, an example in which washing water is additionally introduced in proportion to the amount and weight of laundry that is additionally introduced simultaneously when additional detergent is introduced will be described.

In particular, a second neural network model may be applied to the amount of detergent that is introduced when the additional washing water is introduced in order to output an estimated value of the amount of the additional washing water that is introduced.

Here, the second neural network model may be a neural network model pre-trained using training data including amounts of detergent labeled with the amount of additional washing water that is introduced into the tub.

Meanwhile, when the additional washing water is introduced, the remainder of the washing time set in the first washing cycle may be measured. As previously described, the set washing time is the total washing time set when the first washing cycle is performed, and the measured remaining washing time means the rest of the total washing time.

The remaining washing time may be measured, and the difference between estimated washing time based on the estimated value of the degree of contamination of washing water and the washing time of the first washing cycle may be measured. In the case in which the measured difference in washing time of the first washing cycle is equal to or greater than a threshold value, the processor of the washing machine may inform the user terminal about the extension of the washing time.

That is, the degree of contamination of the additional washing water may be measured, and, in the case in which the estimated degree of contamination of the washing water is equal to or greater than a threshold value, the washing time may be increased. At this time, in the case in which additional time is longer than the remaining washing time, the processor of the washing machine may inform the user terminal about the extension of the washing time in order to remove contaminants from the additional laundry.

Although in FIG. 6, the flowchart is designed such that the second washing cycle is set after the amount of additional laundry is detected, the processor of the washing machine may implement a setting such that, upon determining, after detecting the amount of the additional laundry, that the degree of contamination of the washing water does not need to perform an additional washing cycle in the existing first washing cycle, the set first washing cycle is performed without being changed.

In addition, the state of the washing water may be additionally detected before the washing cycle ends, and the washing cycle may be additionally changed based on the detected conductivity, turbidity, and temperature. When all the washing is performed according to the determined washing cycle, the washing cycle ends (S190).

Information about the above processes of the washing cycle may be transmitted to the user terminal through the transceiver.

The user may transmit a feedback signal to the washing machine through the user terminal indicating whether to perform additional washing for the additional laundry or whether to perform the washing cycle as planned, based on the processes of the washing cycle.

The processor of the washing machine may change the washing cycle or may maintain the existing washing cycle based on the feedback signal received from the user terminal.

The stored washing data may then be used as a reference for determining the washing cycle, rinsing cycle, and spinning cycle when the washing machine is operated again, and may be transmitted to an external server so that the stored washing data can be used as a reference for determining the washing cycle, rinsing cycle, and spinning cycle by other washing machines.

In addition, when a value recorded in the washing data is out of a normal range, the external server may determine that there is an abnormality in the washing machine, and may transmit an alarm to the user indicating that inspection is required.

Meanwhile, the washing machine 100 may accumulate operation information of the washing machine operated while performing the washing cycle, rinsing cycle, and spinning cycle in a memory or an external server, and, on the basis of the accumulated operation information, the washing machine 100 may determine whether more or less detergent than a suitable amount is being injected, and whether the type of detergent is suitable.

Here, the operation information of the washing machine may include at least one of the operation time of the washing machine in each cycle, the amount of detergent introduced into washing water, or the amount of laundry.

This determination may be performed by the washing machine processor, or may be transmitted to the washing machine 100 after being performed in the external server. According to this determination, the washing machine processor may output a suggestion related to at least one of the amount or the type of detergent type to the user.

Such a suggestion may prevent the type and amount of detergent from being determined according to the user's habit, and may guide the user to select the type and amount of detergent suitable for the user's actual washing amount.

In addition, the washing machine processor may also make a suggestion as to the amount of laundry, and may guide the user by warning that too much laundry has been loaded, so that washing can be effectively performed.

As described above, the washing machine according to the embodiment of the present disclosure detects the turbidity of washing water and rinsing water in addition to the conductivity of the washing water and the rinsing water, whereby it is possible to accurately determine the amount and type of detergent introduced in the initial stage of washing such that the washing operation can be performed most efficiently.

Particularly, in the case in which additional laundry is introduced, the washing machine according to the embodiment of the present disclosure operates a washing algorithm in order to estimate the amount of detergent that is additionally introduced based on the degree of contamination of the additional laundry such that effective washing can be performed.

The effects of the present disclosure are not limited to those mentioned above, and other effects not mentioned can be clearly understood by those skilled in the art from the following description.

The example embodiments described above may be implemented through computer programs executable through various components on a computer, and such computer programs may be recorded in computer-readable media. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

The computer programs may be those specially designed and constructed for the purposes of the present disclosure or they may be of the kind well known and available to those skilled in the computer software arts. Examples of computer programs may include both machine codes, such as produced by a compiler, and higher-level codes that may be executed by the computer using an interpreter.

As used in the present disclosure (especially in the appended claims), the singular forms "a," "an," and "the" include both singular and plural references, unless the context clearly states otherwise. Also, it should be understood that any numerical range recited herein is intended to include all sub-ranges subsumed therein (unless expressly indicated otherwise) and therefore, the disclosed numeral ranges include every individual value between the minimum and maximum values of the numeral ranges.

Also, the order of individual steps in process claims of the present disclosure does not imply that the steps must be performed in this order; rather, the steps may be performed in any suitable order, unless expressly indicated otherwise. In other words, the present disclosure is not necessarily limited to the order in which the individual steps are recited. Also, the steps included in the methods according to the present disclosure may be performed through the processor or modules for performing the functions of the step. All examples described herein or the terms indicative thereof ("for example," etc.) used herein are merely to describe the present disclosure in greater detail. Therefore, it should be understood that the scope of the present disclosure is not limited to the example embodiments described above or by the use of such terms unless limited by the appended claims. Also, it should be apparent to those skilled in the art that various modifications, combinations, and alternations can be made depending on design conditions and factors within the scope of the appended claims or equivalents thereof.

The present disclosure is thus not limited to the example embodiments described above, and rather intended to include the following appended claims, and all modifications, equivalents, and alternatives falling within the spirit and scope of the following claims.

What is claimed is:

1. A method comprising:
   providing detergent into a tub of a washing apparatus and performing a first washing cycle based on detecting, by a weight sensor, an initial amount of laundry in the tub;
   determining, by the weight sensor, an amount of additional laundry added into the tub during the performing of the first washing cycle;
   adding detergent into the tub based on the determined amount of the additional laundry;
   measuring a conductivity and a turbidity in order to determine a degree of contamination of washing water in the tub due to the additional laundry;
   measuring a temperature of the washing water;
   correcting the measured conductivity and the measured turbidity based on the measured temperature of the washing water;
   determining the degree of contamination of the washing water based on the corrected conductivity and the corrected turbidity; and
   setting a second washing cycle based on the determined degree of contamination,
   wherein setting the second washing cycle comprises changing an operating condition of the first washing cycle based on the determined degree of contamination being less than a predetermined threshold value, and
   wherein changing the operating condition of the first washing cycle comprises changing a motion intensity of the tub while maintaining an operation time, wherein the operation time includes at least one of a washing operation time, a rinsing operation time, or a spinning operation time of the first washing cycle.

2. The method of claim 1, wherein setting the second washing cycle further comprises resetting the first washing cycle based on the determined degree of contamination being equal to or greater than the predetermined threshold value,
   wherein resetting the first washing cycle comprises changing a sequence of the washing operation, the rinsing operation, or the spinning operation in the first washing cycle and adding an additional at least one washing operation or spinning operation.

3. The method of claim 2, further comprising inputting the determined amount of the additional laundry to a first neural network for estimating the amount of the detergent to be added,
   wherein the first neural network model is trained based on inputted amounts of additional laundry comprising amounts of additional laundry labeled with corresponding amounts of the detergent to be added.

4. The method of claim 2, wherein resetting the first washing cycle further comprises measuring a remainder of a set washing time in the first washing cycle, wherein the set washing time corresponds to a total washing time set when the first washing cycle is performed.

5. The method of claim 4, further comprising:
   after measuring the remainder of the set washing time, providing a user terminal with an extension of the set washing time based on a difference between an estimated washing time and the set washing time of the first washing cycle being greater than a second predetermined threshold value, wherein the estimated washing time is based on an estimated value of the determined degree of contamination.

6. The method of claim 4, further comprising:
   after measuring the remainder of the set washing time, changing the motion intensity of the tub based on a difference between an estimated washing time and the set washing time of the first washing cycle being less than or equal to a second predetermined threshold value, wherein the estimated washing time is based on an estimated value of the determined degree of contamination.

7. The method of claim 1, further comprising adding additional washing water into the tub when the detergent is added, wherein the additional washing water is based on the detected initial amount of laundry and the determined additional amount of laundry.

8. The method of claim 7, wherein adding additional washing water comprises inputting the amount of the detergent added to a second neural network model for estimating the amount of the additional washing water to be added,
   wherein the second neural network model is trained based on inputted amounts of additional laundry comprising amounts of detergent labeled with corresponding amounts of additional washing water to be added into the tub.

9. The method of claim 7, wherein adding additional washing water comprises measuring a remainder of a set washing time in the first washing cycle, wherein the set washing time corresponds to a total washing time set when the first washing cycle is performed, and
   the method further comprises providing a user terminal with an extension of the set washing time based on a difference between an estimated washing time and the set washing time of the first washing cycle being greater than or equal to a threshold value, wherein the estimated washing time is based on an estimated value of the determined degree of contamination.

* * * * *